United States Patent

[11] 3,586,388

[72] Inventor William Stelzer
Milford, Mich.
[21] Appl. No. 765,787
[22] Filed Oct. 8, 1968
[45] Patented June 22, 1971
[73] Assignee Kelsey-Hayes Company
Romulus, Mich.

[54] SKID CONTROL SYSTEM
31 Claims, 4 Drawing Figs.
[52] U.S. Cl. .................................................. 303/21 F,
188/181 A, 303/6 C, 303/10, 303/63
[51] Int. Cl. ..................................................... B60t 8/12,
B60t 8/26
[50] Field of Search........................................... 303/6, 6 C,
10, 21, 61—63, 68—69; 188/181

[56] References Cited
UNITED STATES PATENTS
| | | | |
|---|---|---|---|
| 3,401,982 | 9/1968 | Walker et al. | 303/21 |
| 3,481,653 | 12/1969 | Grancon | 303/21 |
| 3,286,734 | 11/1966 | Hartshorne | 303/21 X |
| 3,306,677 | 2/1967 | Dewar et al. | 303/21 |
| 3,325,226 | 6/1967 | Perrino | 303/21 |
| 3,415,578 | 12/1968 | Walker | 303/21 |

Primary Examiner—Milton Buchler
Assistant Examiner—John J. McLaughlin
Attorney—Harness, Dickey & Pierce ABSTRACT: A skid control system for fluid actuated brakes of a wheeled vehicle which brakes are actuated by a fluid energized power booster and including a modulating valve for modulating the fluid pressure to the power booster whereby the pressure to the fluid actuated brakes will be modulated.

3,586,388

1

SKID CONTROL SYSTEM

SUMMARY ABSTRACT OF THE DISCLOSURE

The present invention relates to skid control systems, and more particularly, relates to a skid control system including a power booster.

It is an object of the present invention to provide a novel skid control system for controlling the brakes of the wheels of a wheeled vehicle.

It is another object of the present invention to provide a novel skid control system for modulating the fluid pressure to a power booster which controls the fluid pressure for the brakes of the wheels of a wheeled vehicle.

It is another object of the present invention to provide a novel skid control system for fluid actuated brakes for wheels of a wheeled vehicle including a power booster and a control valve for modulating or controlling the pressure to the power booster and hence to the brakes in response to an electrical signal indicating the occurrence or the imminence of a wheel skid condition.

It is another object to provide a skid control system of the above-described type for both front and rear wheels and including a modulating valve for selectively varying the energizing pressure to the power booster.

It is another object to provide a skid control system of the latter type including a metering and/or proportioning valve.

Other objects, features and advantages of the present invention will become apparent from the subsequent description and the appended claims, taken in conjunction with the accompanying drawings, in which:

The skid control system of the present invention can be utilized and will be described specifically for use with an automotive vehicle; however, it should be understood that the features of the invention could be utilized with other types of wheeled vehicles including aircraft. For an automotive vehicle, the system of the present invention can be utilized in connection either with the front wheels, the rear wheels or the front and rear wheels. The system will be described for use in conjunction with both the front and the rear wheels of an automotive vehicle.

Figure 1:
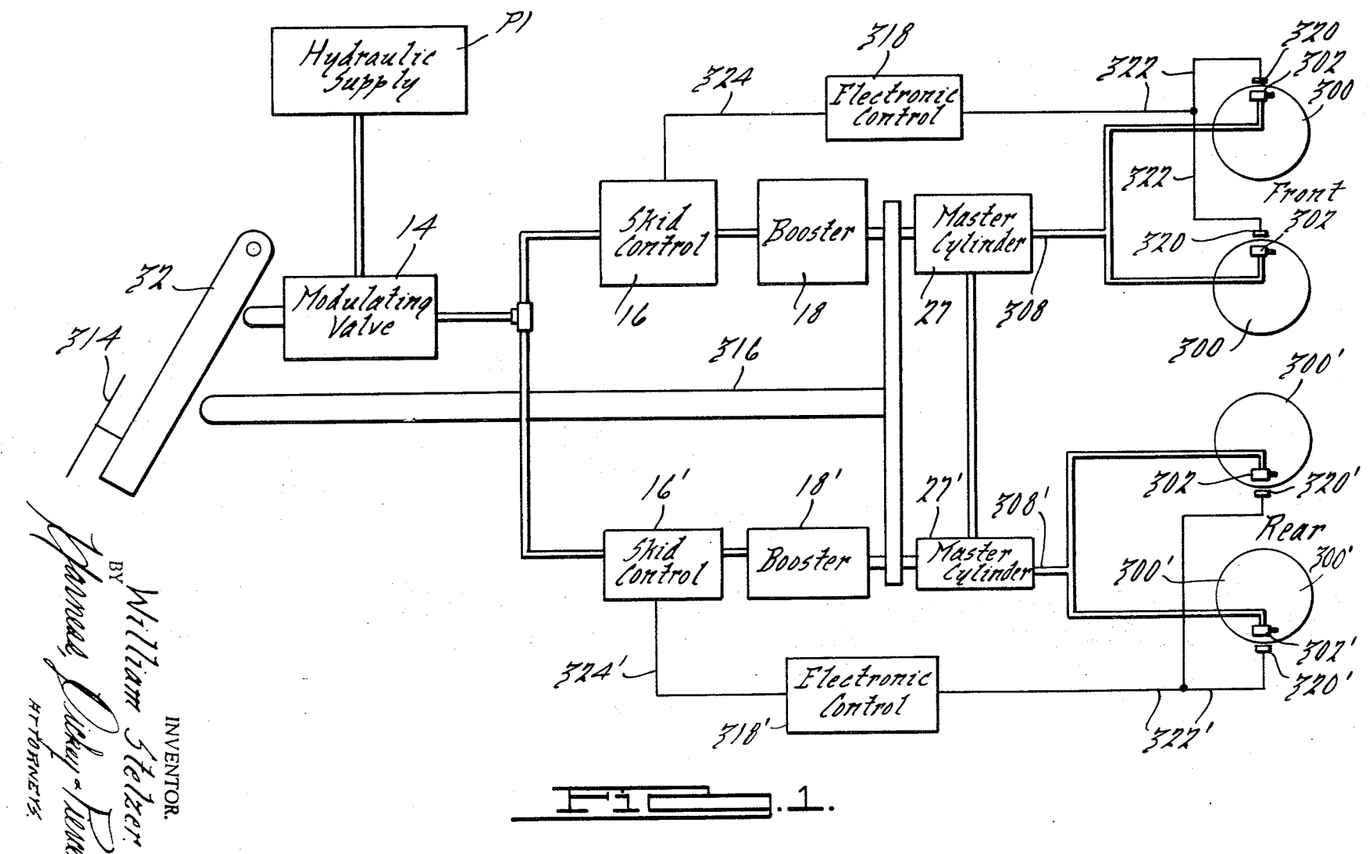
FIG. 1 is a generally schematic diagram of a skid control system embodying features of the present invention.

Looking now to FIG. 1, the schematic diagram generally shows the skid control system for use with the front and rear wheels of an automotive vehicle with the front wheels 300 being equipped with disc brakes actuated by wheel cylinders 302 and with the rear wheels 300' being equipped with brake drums and shoes actuated by wheel cylinders 302'. Hydraulic lines 308 are connected to the cylinders 302 from a front wheel master cylinder assembly 27. Hydraulic lines 308' are connected to the cylinders 302' from a rear wheel master cylinder assembly 27'. The fluid pressure from master cylinders 27, 27' are controlled by power boosters 18, 18', respectively, which receive fluid power from a source P1. The pressure to boosters 18, 18' is selectively controlled by a modulating valve 14 which is selectively operated by the vehicle operator through a foot pedal 314 and linkage 32. The hydraulic supply P1 can be driven by the vehicle power plant. In the event of a loss of power from supply P1, a manual override is provided whereby linkage 32 will be actuable by the operator directly on the master cylinder 27, 27' whereby conventional braking can be effected. This override is diagrammatically represented by the linkage 316.

Skid control valves 16, 16' are located between the modulating valve 14 and the boosters 18, 18', respectively, to modulate the pressure to boosters 18, 18' in the vent of the occurrence of a skid control condition.

The valves 16, 16' are actuated in accordance with electrical signals obtained from electrical control modules 318, 318'. The control module 318 (318') receives information from sensors 320 (320') associated with each of the wheels (300'). The sensors 320 (320') can be of constructions known in the art and since the specific details thereof do not constitute a part of the present invention they have been omitted for the purposes of simplicity. The sensors 320 (320') provide an electrical signal via conductors 322 (322') to the module 318 (318') which signal would be an indication of the rotational velocity of the associated wheels 300 (300').

The control module 318 (318') can be constructed to sense the rate of change in the signal at the conductors 322 (322') and hence to sense the deceleration rate of the associated wheels 300 (300') and to provide an output signal in response to the magnitude of the deceleration of the wheels 300 (300') (or one of the wheels) reaching a preselected magnitude corresponding to a skid condition existing or to be occurring at the wheels 300 (300'). An output or control signal will be transmitted by means of conductors 324 (324') to the skid control valve 16 (16'). In the system of the present invention the control module 318 (318') could be of the type shown in the copending patent application of A. Fielek, Ser. No. 695,005, filed Jan. 2, 1968, for Skid Control System Including Control Circuit for a Hydraulic Modulating Valve, and that application is incorporated herein by reference. The module 318 (318') can provide merely an "on" or "off" signal and modulation of the fluid pressure to the brake cylinders 302 (302') will be provided by the skid control valve 16 (16') in a manner to be seen.

Figure 2A:
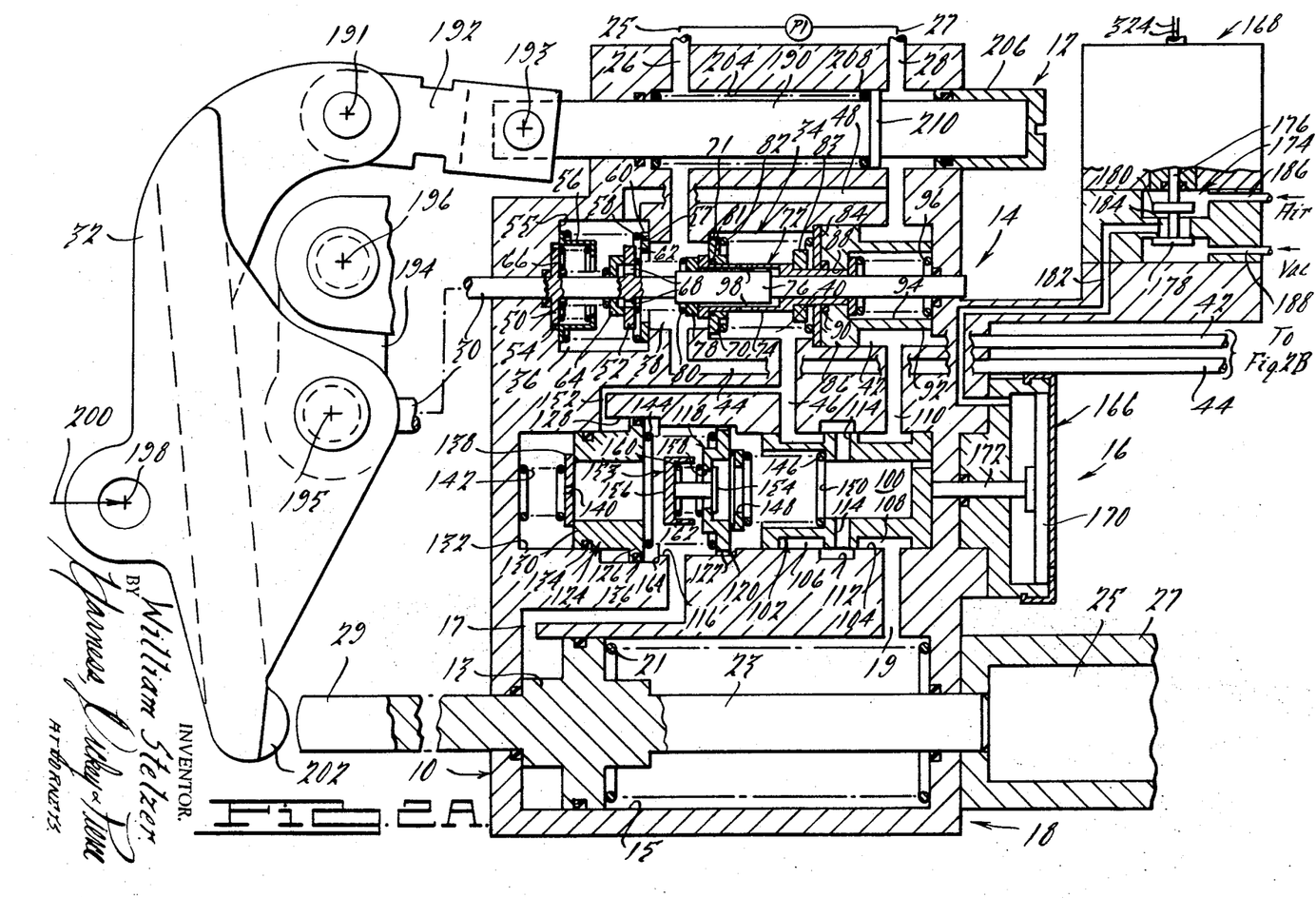
FIGS. 2A and 2B together are a diagrammatic representation of one form of the present invention.
Figure 2B:
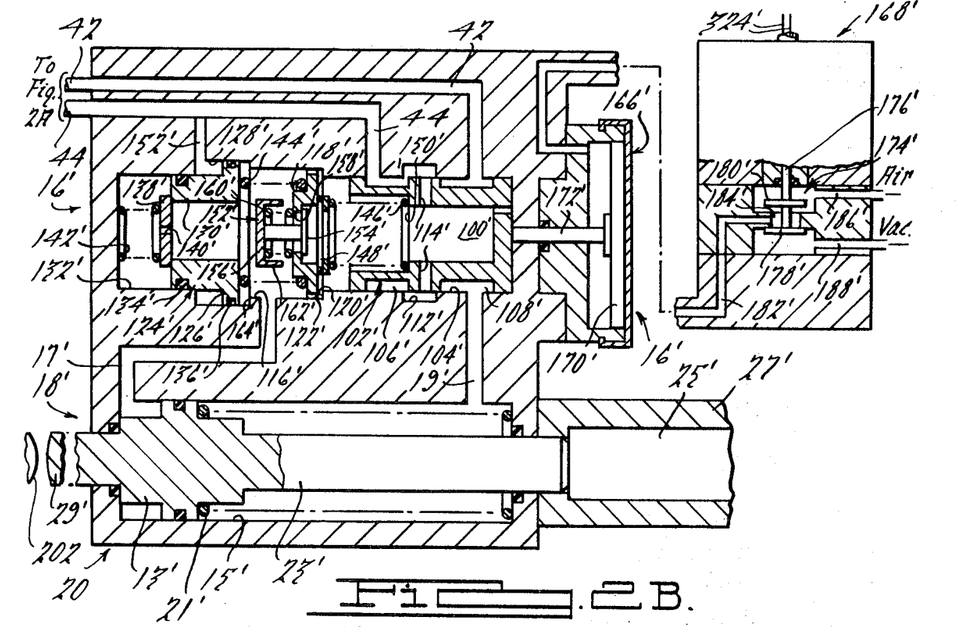

Looking now to the drawings, a first body member 10 is shown and includes a throttle control assembly 12, the modulating valve assembly 14, the skid control valve assembly 16 for the front brakes and the power cylinder assembly 17 for the front brakes. The modulating valve assembly 14 controls the fluid pressure to both the front and rear brakes and hence is connected to a second body assembly 20 which includes the skid control valve assembly 16' for the rear brakes and the power cylinder assembly 18' for the rear brakes. The source of fluid pressure P1 has its outlet 25 connected to an inlet passageway 26 of the body 10 and has its inlet 27 connected to a return passageway 28 in the body assembly 10. The system shown in the drawings is of the open center type and hence fluid under low pressure from the supply P1 will normally be flowing from the outlet 25 of P1 into the passageway 26 and back to the inlet 27 via return passageway 28 (in a manner to be described). As will be seen, pressurized fluid can be transmitted to the power cylinder assemblies 18 and 18' for the front and rear brakes, respectively, in accordance with actuation of modulating valve assembly 14 in a manner to be described.

POWER CYLINDERS 18 AND 18'

The power cylinder assembly 18 includes a piston member 13 reciprocably supported in a cylinder 15 with the cylinder 15 having an inlet passage 17 at one end and an outlet passage 19 at the other end. The piston 13 is normally held in its deactuated position by a spring 21. Piston 13 has an actuating rod portion 23 extending out from the cylinder 15 which is normally in engagement with an actuating piston 25 for a front wheel master cylinder assembly 27. The master cylinder assembly 27 can be of a conventional construction and is actuable to actuate the front brakes via a fluid system separate from that acting on the power cylinder assembly 18. In operation when fluid pressure is transmitted to cylinder 15 via passage 17 to the piston 13 will be moved to the right whereby rod portion 23 will move piston 25 whereby the front brake cylinders will be pressurized by the separate fluid system. Fluid of the front fluid system will be returned from the opposite side of cylinder 15 via return passage 19. The magnitude of fluid pressure acting on the actuating piston 13 can be varied by actuation of the modulating valve assembly 14. The piston 13 has a second rod portion 29 extending oppositely from said portion 23 whereby the piston 13 can be manually actuated in the event of loss of fluid pressure from pump P1.

The power cylinder assembly 18' for the rear brakes is similar to the assembly 18 for the front brakes and hence like parts serving similar functions have been given the same numerical designations with the addition of a prime. The assembly 18' is also actuated by the modulating valve assembly 14 by the fluid of the first fluid system. The power cylinder assembly 18' and master cylinder assembly 27' are shown smaller than corresponding assemblies 18 and 27 for a purpose to be seen. In the apparatus shown in FIG. 1, the front brakes are disc brakes and the rear brakes are drum and shoe-type brakes.

MODULATING VALVE ASSEMBLY 14

The modulating valve assembly 14 has an actuating rod member 30, which can be actuated by a brake linkage member 32, which is actuated by the vehicle operator via a brake pedal, etc., in a conventional manner. The actuating rod 30 is slidably supported in a bore which includes four separate chambers, a modulating chamber 36, an inlet chamber 38, a metering and proportioning chamber 40 and a return chamber 42.

The inlet line 26 communicates through the inlet chamber 38 with a rear brake inlet line 44 which in turn communicates with the inlet passage 17' for the rear brake power cylinder assembly 18' through the rear brake skid control valve assembly 16'(in a manner to be described). In the condition as shown, the pressure at passageway 26 is low and the rear brake power cylinder assembly 18' will not be energized; by actuation of the valve assembly 14 the pressure at passageway 26, and hence to the rear brake power assembly 18', will be increased whereby the rear brakes will be actuated.

It is desirable in an automotive vehicle that the pressure to the front brakes be increased over that pressure to the rear brakes to compensate for weight transfer to the front wheels during a brake application. This has been done in conventional single fluid systems by use of a proportioning valve in the fluid circuit of the master cylinder; an example of this type of proportioning valve is shown in the patent to Stelzer, U.S. Pat. No. 3,258,924, issued July 5, 1966, for Proportioning Valve. The modulating valve assembly 14 includes a proportioning valve. In addition, the valve assembly 14 includes a metering valve. As noted in the braking system of FIG. 1, the front wheel brakes are disc brakes and the rear wheel brakes are conventional drum and shoe brakes. Normally the shoes of the disc brakes are in engagement with the disc and hence will be immediately effective to provide braking upon the application of pressure. With conventional drum and shoe brakes, the shoes are normally held away from the drums by a spring force and hence an initial buildup of fluid pressure is required prior to engagement and to any braking. In order to provide that the front and rear wheel brakes will engage substantially simultaneously a metering valve is used; for conventional systems a metering valve such as that shown in the U.S. Pat. to Stelzer, No. 3,278,241, issued Oct. 11, 1966, for Metering Valve, has been used such that fluid pressure is withheld from the front brakes up to a preselected magnitude corresponding to that required to bring the rear brakeshoes into engagement with the drums; when the fluid pressures exceed that magnitude then the front brakes will also be actuated such that both the front and rear brakes will be actuated simultaneously. Thus the modulating valve assembly 14 includes a metering valve.

In the present invention the proportioning and metering functions are performed by apparatus located in the proportioning and metering chamber 40 and in the return chamber 42 which apparatus is operative (in a manner to be described) with the rod 30.

The inlet pressure from passageway 26 is transmitted to the front wheel power cylinder assembly 18, through the proportioning and metering chamber 34 and through a front brake inlet passage 46, through the front brake skid control valve assembly 16 (in a manner to be described), through the passage 17 to the front brake power cylinder assembly 18 whereby pressure can be applied to the front brakes of the vehicle. When the modulating valve assembly 14 is not actuated, substantially no fluid pressure will be applied to either the front or rear brake power cylinder assemblies 18 and 18', respectively, and the fluid at the inlet line 26 will be recirculated to the outlet line 28 through the modulating chamber 36 via a return line 48. In general, fluid pressure for actuating the power cylinder assemblies 18, 18' will build up as a result of actuation of the rod 30 via the linkage 32; rod 30 will be moved to the right (as shown in the drawing) to restrict the passageway to the modulating chamber 36 whereby pressure will be increased at inlet passage or line 26 and hence at the rear brake inlet line 44 and front brake inlet line 46 causing pressure to be applied to the power cylinder assemblies 18, 18' resulting in actuation of the brakes. This is accomplished by pressure modulating apparatus in the return chamber 36 in connection with rod 30.

PRESSURE MODULATING APPARATUS— MODULATING CHAMBER 36

The rod 30 includes a pair of flanges 50 and 52 located in chamber 36 with the flange 50 normally held against a recessed portion of the rear wall 55 of chamber 36 by the bias of a spring 54 acting between the inner flange of an annular hat-shaped spring retainer 56 and the rod flange 50. The retainer 56 is in turn held against the rear wall 55 of chamber 36 by a spring 58 acting between at outer flange of the retainer 56 and an annular, reaction disc 60 which engages the front wall 57 of chamber 36. The disc 60 is located proximate to and generally overlies a part of the flange 52 of the rod 30 and is normally spaced from the flange 52 whereby an annular passage 62 is defined therebetween. The passage 62 communicates with inlet chamber 38. With the modulating valve 14 deactuated as shown, fluid from inlet passage 26 will enter the inlet chamber 38 and will generally, unrestrictedly travel through the annular passage 62 and enter the modulating chamber 36 and back to return line or passage 28 via return line 48. Upon movement of the rod 30 to the right through actuation of the linkage 32, the opening 62 is restricted resulting in an increase in pressure in inlet chamber 38 and hence an increase in pressure to the power cylinder assemblies 18, 18'. With the pressure in inlet chamber 38 increased over the pressure in modulating chamber 36, the forces on rod flange 52 will be unbalanced whereby the actuating force tending to move rod 50 to the right will be opposed. The greater the restriction, hence higher pressure, the greater the opposing force. This provides "pedal feel" similar to conventional nonpower actuated brakes. It is desirable that this opposing force be increased at higher braking forces, i.e., higher fluid pressures in chamber 38. This is accomplished by disc 60 and spring 58. The bias of spring 58 is selected such that at a preselected pressure in inlet chamber 38 the disc 60 will be moved to the left to engage the rod flange 52; now the fluid pressure in chamber 38 will act on rod 30 against an increased area defined by rod flange 56 and disc 60 whereby the opposing force in the rod 30 will increase at a greater rate for further increases in fluid pressure in chamber 38. A relief valve is defined by a cap 64 which is slidable on the rod 30 between flanges 50 and 52 and which is normally held in engagement against flange 52 by a spring 66. The cap 64 normally closes openings 68 through flange 52; however, if the pressure in chamber 38 exceeds a preselected magnitude, the cap 64 will be unseated and the pressure will be relieved through openings 68.

The pressure developed at inlet chamber 38 will act directly on the power cylinder assembly 18' for the rear wheels via inlet line 44, etc. However, the pressure in chamber 38 will act on the power cylinder assembly 18 for the front wheels only through apparatus in the metering and proportioning chamber 40 in connection with the rod 30.

METERING AND PROPORTIONING APPARATUS—CHAMBERS 40 AND 42

Fluid pressure in chamber 38 is initially blocked from the front power cylinder assembly 18 by an annular washer 70 which normally engages the rear wall 71 of chamber 40 and by an elongated hollow sleeve 72. The enlarged sleeve portion 74 slidably supports the washer 70. The sleeve 72 is slidably supported on rod 30 and has an enlarged portion 74 which is in clearance relation with an enlarged rod portion 76. An annular valve seal 78 is slidably supported on the enlarged rod portion 76 and normally seals the enlarged rearward end of the sleeve 72. The seal 78 is held against the sleeve 72 by the bias of a spring 80. A seal 81 provides a seal between the washer 70 and the sleeve 72.

The washer 70 is held against the rear wall 71 by the bias of a spring 82 which engages an annular seal retainer 84. The spring 82 is guided by an annular spring guide 83 supported on the forward portion of sleeve 72. The retainer 84 is located at the rearward end of retainer chamber 42 and is held in place by a hollow cylinder 86. The rearward end of the cylinder 86 closes that end of chamber 42 and has a bore 88 which slidably supports the forward end of the sleeve 72. A seal 90 seals the bore 88 and sleeve 72 and the retainer 84 holds the seal 90 in place. The cylinder has a reduced diameter forward portion 92 which has an enlarged bore 94 in line with bore 88. The forward end of sleeve 72 is held from entering the enlarged bore by the bias of a spring 96 which acts against a washer 98 and the forward surface of the chamber 42. The washer 98 is slidably supported on rod 30 and engages the forward end of the sleeve 72.

Thus normally the chamber 40 is closed from the inlet chamber 38. As pressure increases in chamber 38 the chamber 40 is still held closed by washer 70, sleeve 72, etc. However, when the preselected pressure is reached in inlet chamber 38, the bias of spring 82 will be overcome and washer 70 will be momentarily opened, however, as soon as the pressure in chamber 40 increases this pressure will act to close the washer 70. Thus the pressure transmitted to the chamber 40 will be less than that in inlet chamber 38 by the preselected amount. The apparatus described thus far performs the metering valve function to maintain the effective braking pressures to the front disc brakes and to the rear drum brakes in line with each other to provide substantially simultaneous actuation. The apparatus in metering also performs a proportioning function noted and hence for pressures in excess of the holdoff pressure will provide for an increase in pressure at a rate greater than that occurring at the rear line 44. This coupled with the greater area of front booster 10 results in front brake pressure from master cylinder 27 increasing at a substantially faster rate than rear brake pressure from rear master cylinder 27'.

The above proportioning effect continues in the manner described until the pressure in inlet chamber 38 reaches a second preselected higher magnitude. At this second pressure it would be desirable to apply still greater braking effort and hence proportionally higher braking pressure to compensate for weight transfer to the front wheels. At the second higher pressure the bias of spring 96 is overcome whereby the sleeve 72 will be moved against the washer 70. Now the force on washer 70 will be the combined result of pressure on washer 70 and pressure on sleeve 72 via the seal 78. Now there is an increased area acted on by the pressure in inlet chamber 38 relative to that acted on by the pressure in chamber 40. This increase in area changes the proportion between the subsequent increases in pressure in chamber 38 and resultant increases in pressure in chamber 40 whereby the pressure in chamber 40 (and hence pressure to the front wheels via inlet line 46) will increase at a faster rate resulting in greater braking effect to the front wheels for pressures in excess of the second preselected pressure.

A plurality of ports 98 through the enlarged portion 74 of sleeve 72 communicate with the clearance between portion 74 and enlarged rod portion 76. Upon deactuation of the valve 14, i.e., release of linkage 30 and return of rod 30 to the left, the pressure in inlet chamber 38 drops and the fluid in chamber 40 can return quickly thereto by unseating the lightly held valve seal 78.

The skid control valve assembly 16 for the front wheels is located between the front brake inlet line 46 from chamber 40 and the inlet line 17 to the power cylinder assembly 18. In a similar manner the skid control assembly 16' for the rear wheels is located between the rear brake inlet line 44 and the inlet line 17' to the power cylinder assembly 18'. The skid control assemblies 16 and 16' are similar and hence only the assembly 18 will be described in detail with the components in assembly 16' similar to those in assembly 16 and performing similar functions being given the same numerical designation with the addition of a prime.

SKID CONTROL ASSEMBLIES 16, 16'

The skid control assembly 16 is located in a bore 100 which communicates directly with inlet lines 46 and 17. The assembly 16 includes a valve member 102 which is slidably supported in a forward portion 104 of bore 100 and when not actuated is located forwardly in bore portion 104. The valve 102 is generally tubular and includes a pair of annular fluid communicating grooves 106 and 108. In its deactuated position, as shown, the groove 108 communicates the outlet passage 19 from cylinder 15 to an outlet path 110 which in turn communicates with return chamber 42 and return line 28. The groove 106 extends from a point in line with the inlet line 46 to a point in line with an annular groove 112 in the bore portion 104. A plurality of radial passages 114 through the portion of the valve 102 intermediate the grooves 106 and 108 are, in the position of valve 102, also located in line with wall groove 112 and communicate groove 112 with bore portion 104. Thus the bore portion 104 is in communication with inlet line 46 via passages 114, wall groove 112, and valve groove 106. The bore 100 has an enlarged bore portion 116, adjacent portion 104, which communicates with inlet 17. An annular throttle valve member 118 is normally spaced from the shoulder 120 defined by the juncture of bore portions 104 and 116 and normally permits fluid to flow from bore portion 104 past shoulder 120 into bore portion 116 and into inlet 17. The valve 118 is generally hat shaped and is slidably supported in bore portion 116 and is provided with a plurality of peripheral notches 122 to permit fluid flow when the valve 118 is spaced from shoulder 120 and to prevent fluid flow when the valve 118 is engaged with shoulder 120. The throttle valve 118 performs a throttling effect in conjunction with a dashpot or differential valve 124.

Valve 124 is annular and has an enlarged flange 126 slidably located in an enlarged bore portion 128 which communicates with bore portion 116. The body portion 130 of valve 124 is slidably supported in a rearward bore portion 132; seals 134 and 136 seal body portion 130 and flange 126, respectively, with their respective bores. The rearward end of valve 124 is generally closed by a dash plate 138 which has a restricted opening 140. The plate 138 is held against the end of valve 124 by the bias of a spring 142. The valve 124 is held in the position shown by a spring 144 which acts between the flanged portion of valve 124 and the throttle valve 118 and by a spring 146 which acts between a retainer 148 engaging throttle valve 118 and a shoulder 150 defined by a counterbore in the rearward end of the valve 102. The springs 142, 144 and 146 are balanced to normally locate the various members in the positions shown.

A fluid passage 152 communicates the valve inlet line 46 with the rearward side of the enlarged bore portion 128. Thus, under normal operating conditions the fluid pressure on each of the various members is balanced since the fluid pressure in bore portion 104, 116, 128 and 132 are equal. Thus for normal braking variations in inlet pressure at inlet line 46 will have no effect on the skid control assembly 16.

In the event that an incipient skid condition is detected by the control module 318 via the front wheel sensors 320, the valve 102 is actuated and moved to the left (by means to be described). In this position, the positions of the annular grooves 106 and 108 are shifted. The groove 106 is located to the left whereby the communication between the input line 46 and bore 100 (and bore portion 104) is interrupted thereby blocking the fluid pressure input from the input line 17 of the power cylinder assembly 18. At the same time the passages 114 through valve 102 are still maintained in communication with the body groove 112. In this position the annular valve groove 108 is in communication with the body groove 112 and the outlet passage 110 and hence with the return port 28. Thus the bore portion 104 is communicated with the return to the source P1. In this connection the fluid pressure in bore portion 116 exceeds that in bore portion 104 thereby moving the throttle valve 118 to its closed position against shoulder 120. Fluid is returned from bore portion 116 to bore portion 104 via a check valve 153 connected with the throttle valve 118. Check valve 153 has a pair of flanges 154, 156 located on opposite sides of a bore 158 through throttle valve 118. A spring 160 normally maintains flange 154 in a closed position over bore 158. When the pressure in bore portion 116 exceeds that in bore portion 104 sufficiently to overcome spring 160, the valve 153 is moved to the right opening the bore 158 permitting fluid to eject from bore portion 116 and hence to be ejected from the rearward end of the cylinder 15 as the piston 13 is retracted. The flange 156 has a plurality of spaced legs 162 which are engageable with valve 118 whereby fluid communication is maintained through bore 158. The piston 13 is retracted by the spring 21 and as it retracts, the pressure of master cylinder 27 is reduced whereby the braking effect is reduced permitting the front wheels 300 to begin to spin back up towards vehicle speed.

The reduction of pressure is rapid and hence braking force is quickly relieved to arrest the incipient skid condition. It is desirable, however, that the pressure be reapplied initially, rapidly and subsequently more slowly to avoid a situation of the brake pressure being reapplied too rapidly and the wheels 300 (300') being immediately placed in another skid condition. If the cycles of brake relief and reapplication occurred rapidly enough to skid pressures, the control of the wheels 300 (300') could in some cases be lost, and eventually a locked wheel condition could occur. To prevent this reapplication of brake pressure after a certain point of rapid increase is slowed to permit a more gradual approach back to line pressure. This feature is provided by the throttle valve 118 and the dashpot valve 124.

When pressure is relieved in the bore portion 116, line pressure still exists in bore portion 128 to act on the flange 126 whereby the dashpot valve 124 is moved to the right against shoulder 164. In this position the volume of bore portion 132 is increased and is, of course, filled with fluid. When the module 16 signals that the brakes should be reapplied, the valve 102 is quickly moved back to its original position (as shown in FIG. 2) and fluid pressure is once again communicated from line 46 to bore portion 104 via valve 102. Now, however, check valve 153 is closed. Initially there is a substantial pressure differential acting on throttle valve 118 and it is initially moved open and pressure increases rapidly. As the pressure increases the differential holding valve 118 open decreases. At the same time increases in fluid pressure on throttle valve 118 urging it open are resisted now by an increase in bias by spring 144 resulting from dashpot valve 124 being in its actuated position and when the differential is sufficiently small valve 118 will be closed. Thus, when the pressure in bore portion 104 is sufficient to move throttle valve 118 open, some fluid will flow to increase the pressure in bore portion 116 and the slight increase will be sufficient to lower the differential and again close the throttle valve 118. This throttling effect will continue gradually increasing the pressure of the bore portion 116. As the pressure in bore portion 116 increases its force of dashpot valve 124 increases whereby the force on valve 124 from the pressure in bore portion 116 exceeds that on valve 124 from the pressure in bore portion 128 whereby the valve 124 will be moved back toward its original position (i.e., to the left). As it moves to the left, the bias on spring 144 tending to hold throttle valve 118 closed decreases until it reaches its original, open position. This retraction of valve 124 and hence opening of valve 118 is delayed by the time required by the fluid trapped in chamber 132 to escape through the restricted opening 140. In this manner after initial rapid reapplication to preselected magnitude, pressure reapplication occurs gradually avoiding the problems incident to rapid reapplications of brake pressure without some throttling.

The valve 102 is actuated by a vacuum actuated force amplifier 166 which in turn is actuated by a solenoid 168. The force amplifier 166 includes a piston 170 having a rod 172 engageable with valve 102. Both ends of the piston 170 are normally communicated with atmosphere with the rod end being communicated to atmosphere through a valve 174 actuated by solenoid 168. Valve 174 includes a plunger 176 having a pair of flanges 178, 180. A fluid line 182 communicates the rod end of piston 170 with a chamber 184 which houses the valve 174. The chamber 184 is connected to a first path 186 connected to atmosphere and to a second path 188 connected to the engine vacuum of the vehicle engine. The valve 174 is normally located such that flange 178 blocks path 188 from chamber 184 and flange 180 communicates path 186 with chamber 184. In this condition both sides of piston 170 are at atmospheric pressure and the valve 102 is not actuated. Upon the occurrence of a skid control signal, the solenoid 168 is actuated by a signal from module 318 via conductor 324 whereby the plunger 176 is moved downwardly (as shown in the drawing); this moves flange 180 to a position to block chamber 184 from atmosphere path 186 and more flange 178 to a position to open the chamber 184 to vacuum path 188. In this condition vacuum is created on rod side of piston 170 whereby the atmospheric pressure on its opposite side causes it to be actuated whereby valve 102 is actuated resulting in the pressure relief described. Upon termination of the skid condition solenoid 168 is deenergized and the valve 174 reverts to its original condition whereby piston 170 can be returned and the reapplication of brake pressure as previously described occurs.

LINKAGE CONTROL ASSEMBLY 12

It is desirable in the event of loss of pressure from source 12 to be able to manually apply the brakes. The linkage 32 is pivotally connected at its upper pivot point 191 to a piston rod 190 via a link 192 which is pivoted to rod 190 at point 193. The linkage 32 is also pivotally connected at an intermediate point 195 to the body 10 via a link 194 which is pivoted to the body 10 at the point 196. The point 195 is generally in line with rod 30. The linkage 32 is connected to the brake linkage actuated by a brake pedal via a lower pivot point 198. Braking force on linkage 32 is generally applied in the direction of the arrow 200. The lower end 202 of the linkage is spaced from the rod portion 29 of actuating piston 13. Thus normally a force on linkage 32 along arrow 200 results in movement of rod 30 and power application of the brakes as discussed. The piston 190 is located in a cylinder 204 and is normally located to the right against a stop cap 206. A spring 208 engages a flange 210 to normally urge the piston 190 to its position as shown. Also pressure in line 26 communicates with the left side of cylinder 204 and flange 210 while return line 28 communicates with the right side of cylinder 204 and flange 210 whereby the fluid pressure also aids in holding piston 190 to the right. In the event of a loss of pressure from source P1 no pressure would act on piston 190 and only the light force of spring 208 would hold it to the right. Upon application of braking force along the line 200 the linkage 32 would pivot about point 196 moving pivot point 191 out and to the left and pulling piston 190 to the left. In this position the lower end 202 of linkage 32 can engage rod portion 29 whereby force can be manually applied to the piston 13 (13') and hence to the master cylinder 27 (27'). Note that as the linkage 28 shifts in position, i.e., pivot 191 moves to the left, its effective lever arm on point 202 is improved, i.e., the line between pivot points 191 and 196 is more nearly at right angles to the force along the arrow 200.

CLOSED CENTER SYSTEM

Figure 3:
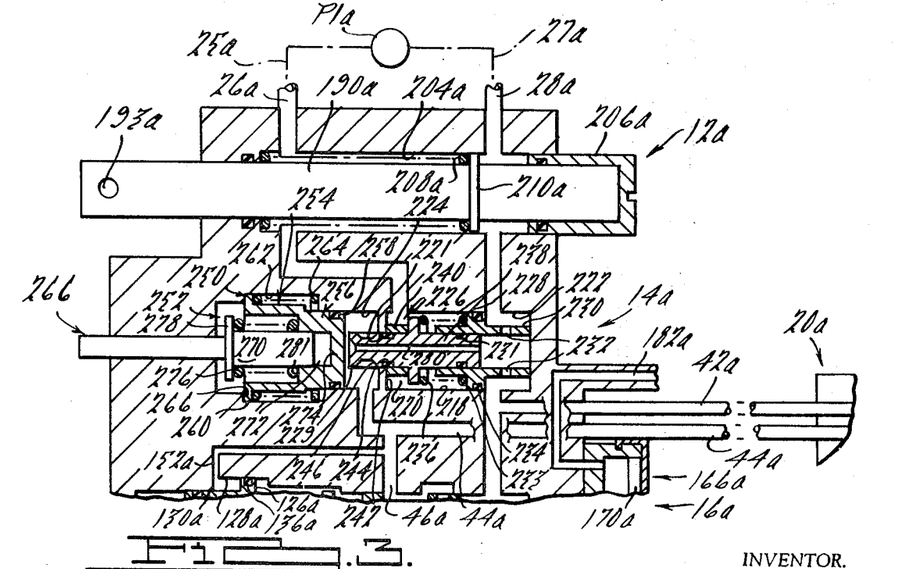
FIG. 3 is a diagrammatic representation of another form of the present invention.

The system described above and shown in FIG. 2 utilizes an open center hydraulic system. A closed center hydraulic system could also be used. Generally, an open center hydraulic system has fluid normally flowing from the source through a generally unrestricted path. The hydraulic circuit to be actuated is directly connected to that path. As long as the path is unrestricted little pressure is developed and hence the connected hydraulic circuit is not actuated; as the path is selectively restricted the pressure increases and the connected hydraulic circuit will be actuated. In a closed center system the fluid is normally at some selected working pressure in a flow path. The hydraulic circuit to be actuated is connected to the fluid path through a valve and the pressure on that circuit will be determined by the extent of actuation of that valve. A closed center system is shown in FIG. 3. In FIG. 3 only the source of pressure and the modulating valve differ from the open center system shown in FIG. 2. Thus only the details of those portions have been shown and described. In the drawing and description components in the system of FIG. 3 are similar to like components of FIG. 2 and in serving similar functions have been given the same numerical designation with the addition of the letter postscript a.

The fluid source P1a is of a closed center type and hence fluid under pressure normally exists at outlet line 25a from source P1a and is returned via return line 27a. The modulating valve assembly 14a has a bore 218 having an inlet chamber portion 220 connected to the inlet line 25a and a return chamber portion 222 connected to return line 27a. An outlet chamber 224 is in line with inlet chamber 220 and communication therebetween via a connecting bore 221 is controlled by valve assembly 226. A valve body 228 is slidably supported in a tubular sleeve 230 and is sealed relatively thereto by a seal 231. Sleeve 230 is supported in bore 218 by an annular flange portion 233 having a seal 234 located therein with the flange portion 232 dividing the bore 218 to define chambers 220 and 222. The valve body 228 is urged towards its position closing bore 221 by a spring 236 which acts between the flange portion 232 and a flange 238 on the valve body 228. An annular seal retainer 240 is located on the opposite side of flange 238 and, with the valve body 228 closed, engages the rearward wall 242 of the chamber 220 to react the force of spring 236 in holding valve body 228 in its closed position. In the latter position an annular seal 244, retained by retainer 240, on valve body 228 is positioned to seal the opening 221. In this position fluid pressure from inlet 25a is blocked from front brake inlet line 46a and rear brake inlet line 44a whereby the associated power cylinder boosters (corresponding to 18 and 18') are not actuated. Movement of the valve body 228 to the right will open the bore 221 whereby fluid pressure can be transmitted to outlet chamber 224 and thence to inlet lines 44a and 46a whereby the associated power boosters are actuated. The magnitude of pressure transmitted (and hence the extent of actuation) can be varied by varying the size of the opening between bore 221 and valve body 228. This is facilitated by providing the valve body 228 with a tapered surface 246 such that the size of the opening will be gradually increased as the valve body 228 is moved to the right and hence the magnitude of the pressure can be gradually increased. The valve body 228 has an end portion 229 extending into chamber 224 and is actuated by an actuating assembly 250 located in a bore 252 which is coaxial with bore 218 and which acts on the end portion 229.

The actuating assembly 250 includes a generally hat shaped intermediate member 254 which has a reduced diameter portion 256 slidably supported in outlet chamber portion 224 with a seal 258 sealing the portion 256 and chamber 224. An enlarged flange 260 is located in an enlarged portion 262 of bore 252 and a spring 264 engages the flange 260 to urge it against a shoulder 266 at the end of enlarged bore portion 262. In this position the reduced diameter portion 256 is closely spaced from the end portion 229 of valve body 228. Actuation of valve body 228 is caused by movement of the intermediate member 254 against it.

Movement of the intermediate member 254 is caused by a rod member 266 which has a stem portion 268 extending out from the chamber 252 and engageable with the linkage 32a for selective actuation of the rod member 266 by the vehicle operator. Rod 266 has an enlarged end portion 270 slidably supported in a reduced diameter bore 272 in intermediate member 254. The end portion 270 is held spaced from the end wall 274 of the bore 272 by a spring 276 which is located between a flange 278 on rod 266 and a shoulder 281 in intermediate member 254.

In operation the vehicle operator in braking actuates linkage 28a causing the rod 266 to be moved to the right. When the force on intermediate member 254, via spring 276, exceeds the bias of spring 264 the member 254 will be moved to the right to engage and move the valve body 228 to the right whereby an opening through bore 221 is caused and fluid pressure transmitted to outlet chamber 224. The fluid pressure in chamber 224 will act on the intermediate member 254 providing a force in opposition to the actuating force exerted by the vehicle operator via linkage 32a. The opposing force will increase with increase in actuating pressure in chamber 224 and hence "pedal feel" will be provided to the operator. The opposing force will increase generally linearly until the end portion 270 bottoms out in bore 272. This occurs at higher braking pressures and thereafter for further increases in brake pressure in opposing force increases at a greater rate since at this time further actuation requires that spring 264 be compressed.

When the vehicle operator releases the brake the linkage 28a permits rod 266 to return and intermediate member 254 will be returned. Fluid under pressure in chamber 224 (and from the front and rear power cylinder assemblies) can be returned to the source via a bore 280 through valve body 228, through the inner forward end of sleeve 230, and through ports 232 to return chamber 222 and return line 27a. Note that when valve body 228 is being actuated the above return path is blocked by engagement of intermediate member 254 with end portion 229.

In the modulating valve assembly 14a for the system of FIG. 3 proportioning and metering valves have been omitted. Separate valves could be added in the appropriate master cylinder circuit.

While it will be apparent that the preferred embodiment of the invention disclosed is well calculated to fulfill the objects above stated, it will be appreciated that the invention is susceptible to modification, variation and change without departing from the proper scope or fair meaning of the invention.

What I claim is:

1. In a skid control system for controlling fluid pressure actuated brakes of at least one wheel of a wheeled vehicle by controlling the fluid pressure to the brakes, said system comprising control means for providing an output signal in response to the detection of a skid condition at the one wheel, first fluid circuit means actuable for actuating the brakes with the magnitude of brake actuation varying with variations in the magnitude of a first fluid pressure in said first circuit means, second fluid circuit means selectively actuable for the vehicle operator for actuating said first fluid circuit means, said second circuit means comprising booster means actuable in response to said second fluid pressure for acting on said first fluid circuit means for varying the pressure in said first circuit means in accordance with selected variations in the magnitude of a second fluid pressure in said second circuit means, source means for providing fluid under pressure to said second circuit means, said second circuit means further comprising modulating means operable by the vehicle operator for selectively varying the magnitude of fluid pressure from said source means for providing said second fluid pressure and skid control means interposed between said modulating means and said booster means and normally not effective for controlling the flow of fluid passing there through to said booster means and responsive to said output signal for controlling the flow of fluid therethrough to said booster means whereby the magnitude of said second fluid pressure from said modulating valve and hence of said first fluid pressure is controlled to inhibit a skid condition.

2. The system of claim 1 with said skid control means comprising valve means operable upon actuation to rapidly reduce the magnitude of said second fluid pressure and operable upon deactuation to increase the magnitude of said second fluid pressure rapidly to a selected magnitude and then slowly.

3. The system of claim 1 with said source means having an outlet and a return and with said skid control means comprising an actuating valve actuable to one position in response to actuation of said skid control means for blocking said second fluid pressure from said booster means while relieving the pressure to said booster means.

4. In a skid control system for controlling fluid pressure actuated brakes of at least one wheel of a wheeled vehicle by controlling the fluid pressure to the brakes, said system comprising control means for providing an output signal in response to the detection of a skid condition at the one wheel, first fluid circuit means actuable for actuating the brakes with the magnitude of brake actuation varying with variations in the magnitude of a first fluid pressure in said first circuit means, second fluid circuit means selectively actuable by the vehicle operator for actuating said first fluid circuit means and for varying the pressure in said first circuit means in accordance with selected variations in the magnitude of a second fluid pressure in said second circuit means, source means for providing fluid under pressure to said second circuit means, said second circuit means further comprising modulating means operable by the vehicle operator for selectively varying the magnitude of fluid pressure from said source means for providing said second fluid pressure and skid control means responsive to said output signal for reducing the magnitude of said second fluid pressure whereby the magnitude of said first fluid pressure is reduced, said skid control means comprising valve means operable upon actuation to rapidly reduce the magnitude of said second fluid pressure and operable upon deactuation to increase the magnitude of said second fluid pressure rapidly to a selected magnitude and then slowly, said valve means comprising check valve means operable for rapidly reducing the magnitude of said second fluid pressure and throttle valve means operable to one condition for causing an increase in magnitude of said second fluid pressure slowly.

5. The system of claim 4 with said throttle valve means in said one condition increasing the magnitude of said second fluid pressure in accordance with the magnitude of a bias holding said throttle valve means in said one condition and bias means for slowly varying the magnitude of said bias on said throttle valve means.

6. The system of claim 5 with said bias means comprising a bias valve having a preselected orifice with the variation in magnitude of said bias determined by the flow of fluid through said orifice.

7. In a skid control system for controlling fluid pressure actuated brakes of at least one wheel of a wheeled vehicle by controlling the fluid pressure to the brakes, said system comprising control means for providing an output signal in response to the detection of a skid condition at the one wheel, first fluid circuit means actuable for actuating the brakes with the magnitude of brake actuation varying with variations in the magnitude of a first fluid pressure in said first circuit means, second fluid circuit means selectively actuable by the vehicle operator for actuating said first fluid circuit means and for varying the pressure in said first circuit means in accordance with selected variations in the magnitude of a second fluid pressure in said second circuit means, source means for providing fluid under pressure to said second circuit means, said second circuit means further comprising modulating means operable by the vehicle operator for selectively varying the magnitude of fluid pressure from said source means for providing said second fluid pressure and skid control means responsive to said output signal for reducing the magnitude of said second fluid pressure whereby the magnitude of said first fluid pressure is reduced, said second circuit means booster means actuable in response to said second fluid pressure for acting on said first fluid circuit means, said source means having an outlet and a return and with said skid control means comprising an actuating valve actuable to one position in response to actuation of said skid control means for blocking said second fluid pressure from said booster means while relieving the pressure to said booster means, said booster means having an inlet and a return path and providing pressure boosting to said second circuit mean when said inlet is subject to fluid pressure and with said skid control means having a second position in which said inlet is connected to said outlet via said modulating means and said return path is connected to said return via said modulating means.

8. The system of claim 7 with said skid control means in said one position connecting said outlet from said source means to said inlet via said modulating means and said return path to said return.

9. The system of claim 8 for use with a vehicle having front and rear wheels and front and rear wheel brakes, said second circuit means comprising first and second booster means for said front wheel brakes and for said rear wheel brakes, respectively, each connected to said modulating means.

10. The system of claim 9 with said control means comprising first and second skid control means connected from said modulating means to said first and second booster means, respectively.

11. The system of claim 10 with said modulating means providing fluid pressures to said first and second booster means varying in a first preselected relation relative to each other up to a preselected pressure and comprising proportioning valve means operable at said preselected pressure in said second circuit means for varying the fluid pressure to said first and second booster means in a second preselected relation.

12. The system of claim 11 with said first preselected relation providing for similar variations in pressure to said first and second booster means in response to selected actuation of said modulating means, said second preselected relation providing for relatively greater increases in pressure to said first booster means relative to said second booster means.

13. The system of claim 12 with the front wheel brakes being disc brakes and with the rear wheel brakes being drum brakes, said modulating means comprising metering valve means for holding off the pressure to said first booster means from said modulating valve means until attainment of a different preselected pressure in said second circuit means.

14. In a skid control system for controlling fluid pressure actuated brakes of at least one brake of a wheeled vehicle which brakes are actuated through a first fluid circuit including a master cylinder for varying the fluid pressure to the brakes in accordance with variations of an actuating force applied to the master cylinder, said system comprising: a source of fluid pressure providing fluid pressure independently of the vehicle operator, modulating valve means connected to said source and selectively operable by the vehicle operator or varying the fluid pressure at an outlet, a power booster connected to the master cylinder and to said outlet of said modulating valve for varying the actuating force to the master cylinder in accordance with variations in the fluid pressure at said outlet, and skid control means interposed between said outlet of said modulating valve means and said power booster and normally not effective for controlling the flow of fluid pressure therethrough to said power booster and responsive to an incipient skid condition for controlling the flow of fluid therethrough to said power booster whereby the magnitude of the fluid pressure to said power booster and hence of the force to the master cylinder is controlled to inhibit a skid condition.

15. The system of claim 14 with said skid control means comprising a valve actuable to relieve the fluid pressure to said power booster and vacuum actuated actuating means responsive to said incipient skid condition for actuating said valve.

16. The system of claim 14 with said control means comprising valve means actuable to a first condition upon detection of an incipient skid condition to rapidly reduce the magnitude of pressure on said power booster and actuable to a second condition upon detection of cessation of the incipient skid condition to provide the reapplication of pressure to said power booster rapidly to a preselected pressure and then gradually.

17. The system of claim 14 with said source being an open center hydraulic system.

18. The system of claim 14 with said source being a closed center hydraulic system.

19. In a skid control system for controlling fluid pressure actuated brakes of at least one brake of a wheeled vehicle which brakes are actuated through a first fluid circuit including a master cylinder for varying the fluid pressure to the brakes in accordance with variations of an actuating force applied to the master cylinder, said system comprising: a source of fluid pressure providing fluid pressure independently of the vehicle operator, modulating valve means connecting to said source and selectively operable by the vehicle operator for varying the fluid pressure at an outlet, a power booster connected to the master cylinder and to said outlet of said modulating valve for varying the actuating force to the master cylinder in accordance with variations in the fluid pressure at said outlet, and skid control means connected to said modulating valve means and to said power booster and responsive to an incipient skid condition to relieve the fluid pressure to said power booster, said skid control means comprising valve means actuable to a first condition upon detection of an incipient skid condition to rapidly reduce the magnitude of pressure on said power booster and actuable to a second condition upon detection of cessation of the incipient skid condition to provide the reapplication of pressure to said power booster rapidly to a preselected pressure and then gradually, said valve means comprising check valve means operable for rapidly reducing the magnitude of the fluid pressure on said power booster and throttle valve means operable to one condition for causing an increase in the fluid pressure slowly.

20. The system of claim 19 with said throttle valve means in said one condition increasing the magnitude of said second fluid pressure in accordance with the magnitude of a bias holding said throttle valve means in said one condition and bias means for slowly varying the magnitude of said bias on said throttle valve means.

21. The system of claim 20 with said bias means comprising a bias valve having a preselected orifice with the variation in magnitude of said bias determined by the flow of fluid through said orifice.

22. The system of claim 21 with said bias valve being movable from a normally fixed position to a different actuated position in response to pressure relief to said power booster.

23. The system of claim 22 with said bias valve being actuated by the fluid pressure at said outlet.

24. In a skid control system for controlling fluid pressure actuated brakes of at least one brake of a wheeled vehicle which brakes are actuated through a first fluid circuit including a master cylinder for varying the fluid pressure to the brakes in accordance with variations of an actuating force applied to the master cylinder, said system comprising: a source of fluid pressure providing fluid pressure independently of the vehicle operator, modulating valve means connected to said source and selectively operable by the vehicle operator for varying the fluid pressure at an outlet, a power booster connected to the master cylinder and to said outlet of said modulating valve for varying the actuating force to the master cylinder in accordance with variations in the fluid pressure at said outlet, and skid control means connected to said modulating valve means and to said power booster and responsive to an incipient skid condition to relieve the fluid pressure to said power booster, further comprising manually actuable means having one position for actuating said modulating means via actuation by the vehicle operator and having a second position responsive to loss of pressure from said source for acting directly on the master cylinder to permit actuation of the brakes directly by the vehicle operator said manually means including a linkage assembly providing for an increase in mechanical advantage for operation on the master cylinder when in said second position.

25. The system of claim 24 with said modulating means providing a reaction force to said manually actuable means resisting actuation with said reaction force increasing with increased pressure at said outlet.

26. The system of claim 25 with said modulating means providing for increases of said reaction force in response to increases of the pressure at said outlet in accordance with one preselected rate up to a preselected magnitude and at a higher rate at pressures greater than said preselected magnitude.

27. In a system for controlling fluid pressure actuated brakes of front and rear brakes of a wheeled vehicle which front and rear brake are actuated through first and second fluid circuits including first and second master cylinders, respectively, for varying fluid pressure to the brakes in accordance with variations of an actuating force applied to the master cylinders, said system comprising: a source of fluid pressure providing fluid pressure independently of the vehicle operator, modulating valve means connected to said source and selectively operable by the vehicle operator for varying the fluid pressure at an outlet, first and second power boosters connected to the first and second master cylinders respectively, and to said outlet of said modulating valve means for varying the actuating force to the first and second master cylinders, respectively, in accordance with variations in the fluid pressure at said outlet, and proportioning valve means operable at a preselected pressure at said outlet for varying the pressure to one of said first and second boosters at a different rate than that to the other.

28. The system of claim 27 with said modulating valve means varying the pressure to said first and second boosters in a first preselected relation up to said preselected pressure and with said proportioning valve means upon actuation varying the fluid pressure to said first and second boosters in a second preselected relation.

29. The system of claim 28 with said first preselected relation providing for similar variations in pressure to said first and second boosters in response to selected actuation of said modulating means, said second preselected relation providing for relatively greater increases in pressure to said first booster relative to said second booster.

30. The system of claim 29 with the front wheel brakes being disc brakes and with the rear wheel brakes being drum brakes, said modulating means comprising metering valve means for holding off the pressure to said first booster means until attainment of a different preselected pressure at said outlet.

31. The system of claim 27 with the front wheel brakes being disc brakes and with the rear wheel brakes being drum brakes, said modulating means comprising metering valve means for holding off the pressure to said first booster means until attainment of a different preselected pressure at said outlet.